Oct. 29, 1963 J. D. TURLAY 3,108,490
PULLEY AND VIBRATION DAMPER UNIT
Filed July 13, 1956

INVENTOR.
Joseph D. Turlay
BY
Paul Fitzpatrick
ATTORNEY.

United States Patent Office 3,108,490
Patented Oct. 29, 1963

3,108,490
PULLEY AND VIBRATION DAMPER UNIT
Joseph D. Turlay, Flint, Mich., assignor to General Motors Corporation, Detroit, Mich., a corporation of Delaware
Filed July 13, 1956, Ser. No. 597,793
1 Claim. (Cl. 74—574)

This invention relates to vibration dampers for rotating shafts and has particular relation to vibration dampers for the crankshafts employed in internal combustion engines for automotive and other purposes.

In internal combustion engines for automotive and other purposes it is particularly desirable to have the overall length of the engine as short as possible, to employ a small number of simple and easily manufactured and assembled parts and to provide a maximum of efficient performance within such limitations.

To accomplish this it is proposed to construct a hub adapted to be assembled on the end of the crankshaft of an engine, such hub being preferably made of two simple and easily assembled parts forming a groove in which a relatively large annular mass may be mounted between resilient rings compressed between the hub and the mass by the assembly of the parts. It is further proposed to attach a pulley at the end of the hub in such a way that the belt driving part of the pulley will extend around the hub to minimize the length of the structure extending beyond the end of the crankshaft of the engine. It is proposed to construct the groove in the hub and the annular mass in such a way that no close fits will be required. Notwithstanding this, the hub and mass may be accurately and concentrically positioned during the operation of the damper, as a result of the compression of the resilient means during the assembly of the parts.

Figure 1:
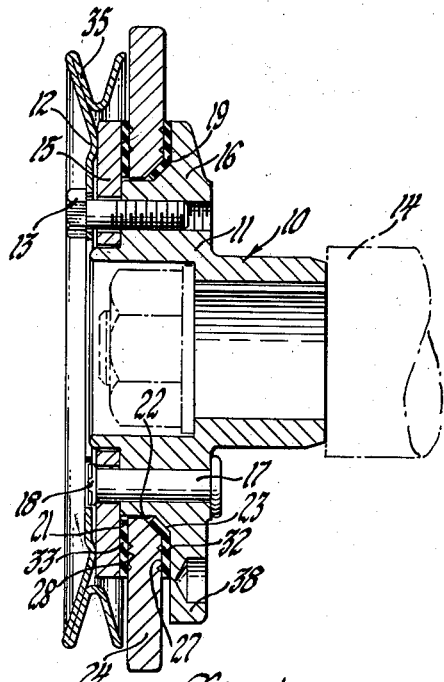
Figure 3:
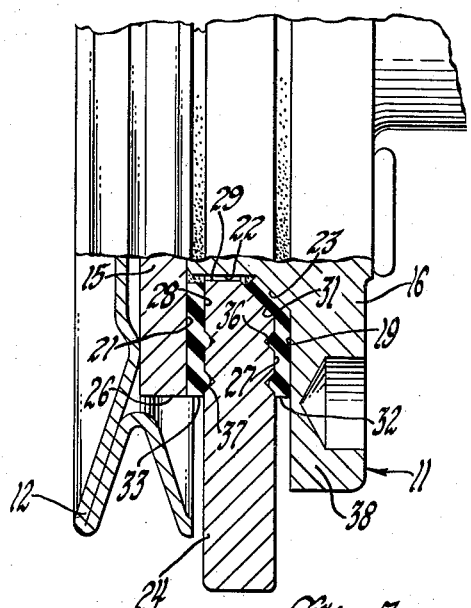
Figure 2:
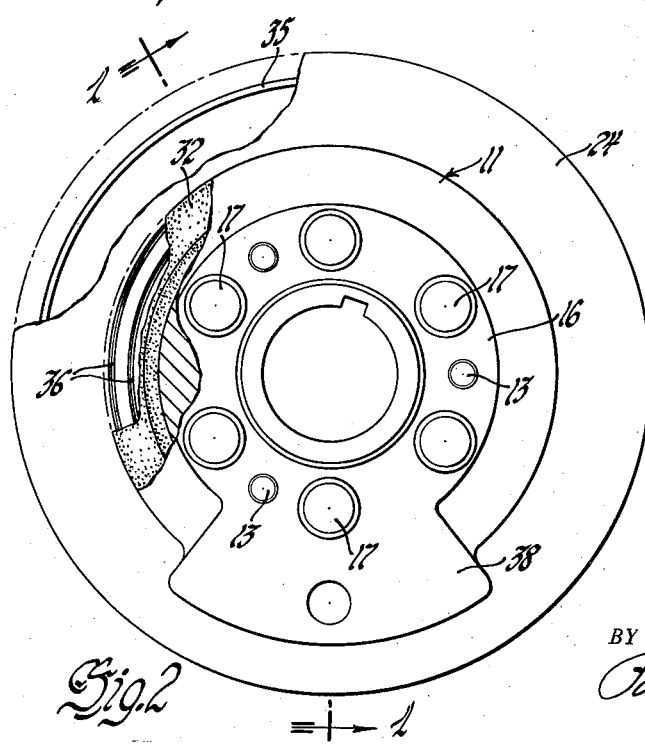

In the drawing:
FIGURE 1 is a longitudinal sectional view through a damper and pulley unit embracing the principles of the invention and applied to the end of an engine crankshaft, the latter being shown in broken lines.
FIGURE 2 is an end view of the structure illustrated by FIGURE 1 with parts thereof broken away to better illustrate the internal construction of different parts of the structure.
FIGURE 3 is an enlarged fragmentary view of the structure as illustrated by FIGURE 1 with certain parts of the structure shown in cross section and other parts shown in elevation.

The damper and pulley unit 10 embodying the invention comprises a hub 11 and pulley 12, secured together by bolts 13 and adapted to be mounted on the forward end of an engine crankshaft 14. The hub 11 is formed by a support 16 and an annular plate 15, the two being adapted to be secured together by a ring of studs 17 extending therethrough and staked at 18 on the plate side of the hub. The pulley 12 has a ring of openings therein for receiving the staked ends 18. Outwardly of the ring of studs 17 the hub 11 is formed to provide a peripheral groove extending in a plane normal to the axis of rotation to the shaft 14 and formed in the hub concentrically with respect to the hub and the axis of the shaft 14. The groove is formed by parallel side surfaces 19 and 21 and an inner surface 22, the side surface 21 being formed on the plate 15, the side surface 19 being formed on the support 16. The inner surface 22 may include a frusto-conical surface 23 on the side of the groove opposite the plate 15 and with the base of the surface remote from the plate 15. The groove is adapted to receive the inner peripheral part of a flywheel or annular mass indicated at 24. It is considered preferable to construct the annular mass 24 of considerable larger diameter than the diameter of the hub 11 to provide an annular shoulder 26 around the plate 15. Such diameter also makes it possible to increase the radius of gyration of the mass without unnecessarily increasing the length of the entire structure. The mass 24 is narrower in width than the groove in the hub 11 to provide side surfaces 27 and 28 that are spaced from the side surfaces 19 and 21. The inner surface 29 of the mass 24 is also larger than the inner surface 22 within the groove of the hub 11. The inner surface 29 also embodies a frusto-conical surface 31, which is spaced from the surface 23 and substantially parallel thereto.

Notwithsanding the fact that the surface 29 is larger than the surface 22 it is proposed to assemble the structure in such manner that the mass 24 will be concentric with respect to the hub 11. This may be done by employing the resilient annular means or rubber rings indicated at 32 and 33. With the parts disassembled the ring 32 may be placed in the groove in the hub 11 and the mass 24 positioned in the groove and against the ring 32. Then the ring 33 may be positioned in the groove against the mass 24. The thickness of the rings 32 and 33 is such that when the plate 15 is assembled by staking the studs 17 the rings 32 and 33 will be compressed between the mass and the hub. It will be apparent that the ring 32 will be compressed partly between the side surfaces 19 and 27 of the support 16 and the mass 24 and partly between the frusto-conical surfaces 31 and 23. The compression of the ring 32 between the surfaces 31 and 23 will result in equal radial forces affecting the inner surface of the mass 24 which will center the mass 24 upon the hub 11. In order to prevent the mass 24 from vibrating radially with respect to the hub 11 it is proposed to form concentric grooves 36 and 37 in one or more of the side surfaces engaged by the resilient rings 32 and 33. Such concentric grooves will have the material of the rings 32 and 33 compressed therein which will tend to maintain the mass 24 in its concentric relation to the hub 11.

The pulley 12 may be formed of sheet metal as indicated and may have the belt engaging part thereof formed to provide a groove 35, the part being adapted to extend around the shoulder 26 and into close proximity to the adjacent surface of the mass 24. The part 38 of the support 16 forms a counterbalancing weight that is employed in balancing the crankshaft 14 of the engine.

The claim:
A vibration damper for engine crankshafts and the like and comprising, a hub having a peripheral groove formed concentrically in the exterior surface thereof, an annular mass disposed in said groove and having sides spaced from the sides of said hub forming said groove, said annular mass also being larger than said groove and being spaced from said hub around the inner peripheral surface of said mass to provide an annular clearance, and resilient annular means in compression between the sides of said groove and said mass, said resilient annular means being spaced from one another throughout said annular clearance, one side of said hub forming said groove and one side of said mass at the inner extremities of said one side of said groove and said mass being formed to provide parallel frusto conical surfaces reducing the width of said mass and groove toward the inner peripheral surface of said hub, said resilient annular means on said one side of said groove and mass being compressed between said parallel frusto conical surfaces for centering said mass on said hub.

(References on following page)

References Cited in the file of this patent

UNITED STATES PATENTS

| | | |
|---|---|---|
| 2,269,966 | Wemp | Jan. 13, 1942 |
| 2,380,770 | McFarland | July 31, 1945 |
| 2,526,744 | Hardy | Oct. 24, 1950 |
| 2,723,573 | Dillman | Nov. 15, 1955 |
| 2,764,038 | Pierce | Sept. 25, 1956 |
| 2,779,210 | Holloway | Jan. 29, 1957 |

FOREIGN PATENTS

| | | |
|---|---|---|
| 329,436 | Great Britain | May 22, 1930 |
| 380,492 | Great Britain | Sept. 12, 1932 |